(12) United States Patent
Vogel

(10) Patent No.: US 10,655,562 B2
(45) Date of Patent: May 19, 2020

(54) ROTARY COMPRESSOR FOR GASEOUS FLUIDS

(71) Applicant: Richard H. Vogel, North Kingstown, RI (US)

(72) Inventor: Richard H. Vogel, North Kingstown, RI (US)

( * ) Notice: Subject to any disclaimer, the term of this patent is extended or adjusted under 35 U.S.C. 154(b) by 275 days.

(21) Appl. No.: 15/654,191

(22) Filed: Jul. 19, 2017

(65) Prior Publication Data

US 2017/0314508 A1 Nov. 2, 2017

Related U.S. Application Data

(62) Division of application No. 14/726,100, filed on May 29, 2015, now Pat. No. 9,732,699.

(Continued)

(51) Int. Cl.
| | | |
|---|---|---|
| *F01C 1/18* | (2006.01) | |
| *F01C 1/24* | (2006.01) | |
| *F03C 2/00* | (2006.01) | |
| *F02G 1/04* | (2006.01) | |
| *F02G 5/00* | (2006.01) | |
| *H02K 7/18* | (2006.01) | |
| *F04C 23/00* | (2006.01) | |
| *F04C 29/12* | (2006.01) | |
| *F04C 18/18* | (2006.01) | |
| *F04C 15/06* | (2006.01) | |
| *F04C 2/08* | (2006.01) | |

(52) U.S. Cl.
CPC ................ *F02G 1/04* (2013.01); *F02G 5/00* (2013.01); *F04C 2/084* (2013.01); *F04C 15/06* (2013.01); *F04C 18/18* (2013.01); *F04C 23/001* (2013.01); *F04C 29/12* (2013.01); *H02K 7/1823* (2013.01)

(58) Field of Classification Search
CPC .. F04C 18/18; F04C 2/08; F04C 2/082; F04C 2/084; F04C 23/001; F04C 23/008; F04C 15/06; F04C 29/12; F02G 1/04; F02G 5/00; H02K 7/1823
USPC ......... 418/15, 75, 77, 79–80, 180, 189–190, 418/206.1–206.9; 417/301, 299, 310
See application file for complete search history.

(56) References Cited

U.S. PATENT DOCUMENTS 2,319,374 A * 5/1943 Ungar ..................... F04C 2/086
                                                          418/79
2,986,096 A * 5/1961 Booth ..................... F04C 2/086
                                                          418/79

(Continued)

FOREIGN PATENT DOCUMENTS

| JP | 02045670 A | * | 2/1990 | ................. F04C 2/08 |
| WO | 2016004414 A1 | | 1/2016 | |

*Primary Examiner* — Theresa Trieu
(74) *Attorney, Agent, or Firm* — St. Onge Steward Johnston & Reens, LLC

(57) ABSTRACT

A compressor for gaseous fluids comprises a positive displacement gear pump, as typically used for liquid transfer, modified to effect compression of gases. The pump inlet includes a main inlet plus multiple secondary inlets feeding inlet gases to gear voids spaced from and moving away from the main inlet. The pump outlet includes a main outlet plus multiple feedback passages feeding partially pressurized outlet gases to gear voids spaced from and moving toward the main outlet. The supplemental inlets and feedback passages increase both the throughput of the compressor and the amount of compression imparted to the gases.

6 Claims, 4 Drawing Sheets

Related U.S. Application Data

(60) Provisional application No. 62/004,462, filed on May 29, 2014.

(56) References Cited

U.S. PATENT DOCUMENTS

| | | | |
|---|---|---|---|
| 4,275,562 A | | 6/1981 | Fejer |
| 4,480,970 A | * | 11/1984 | Smith .................... F04C 15/06 |
| | | | 418/15 |
| 5,246,358 A | * | 9/1993 | Gu .......................... F04C 2/088 |
| | | | 418/191 |
| 5,537,823 A | | 7/1996 | Vogel |
| 7,444,818 B1 | | 11/2008 | Brostmeyer |
| 8,863,519 B2 | | 10/2014 | Kraft |
| 2007/0234702 A1 | | 10/2007 | Hagen et al. |
| 2009/0019853 A1 | | 1/2009 | Nilsson |
| 2009/0165456 A1 | | 7/2009 | Masada |
| 2011/0289922 A1 | | 12/2011 | Myers et al. |
| 2012/0151961 A1 | | 6/2012 | Ha et al. |
| 2014/0174084 A1 | | 6/2014 | Kontomaris |
| 2014/0298813 A1 | | 10/2014 | Brunhuber et al. |
| 2014/0373542 A1 | | 12/2014 | Yanagi |
| 2015/0337692 A1 | | 11/2015 | Leibowitz et al. |
| 2015/0377076 A1 | | 12/2015 | Giegel et al. |

\* cited by examiner

ROTARY COMPRESSOR FOR GASEOUS FLUIDS

FIELD OF THE INVENTION

The present invention relates in part to heat flow processing for power plants that provide electrical power generation, in part to a new form of gaseous compression and expansion mechanisms, and in part to a new type of micropowerplant for local generation of electrical power as well as providing local heating and cooling service in a unique manner resulting in greatly increased energy efficiencies as well as load reduction of and/or supplementation to the nationwide electrical grid. The system of the present invention makes use of certain aspects of the prior U.S. Pat. Nos. 4,275,562 and 5,537,823, the entire contents of which are incorporated herein by reference.

BACKGROUND OF THE INVENTION

Historically, the generation and distribution of electrical energy has involved the use of very large, centralized generation plants, strategically located, often close to fuel sources and/or water bodies for cooling. The generation plants are interconnected through a nationwide electrical grid which enables the distributed transmission of the generated electrical power to remotely located consumers. For a number of reasons, including the centralized location of power plants and the regulatory environment under which the power generators function, the generation of power historically has been and continues to be largely done by the burning of fuels (coal, oil, natural gas) to drive large turbine generators. Although improvements have been made over the years, the existing processes of converting heat energy, from the burning of fuels, to the generation of electrical energy, function at relatively low energy efficiencies. Because a large percentage of the heat generated from the burning of fuels is not able to be converted to electrical energy, the process results in the discharge of huge amounts of heat into the ambient. This not only wastes the energy but can also create environmental issues.

In some instances a small portion of the rejected heat from an electrical generating facility may be distributed locally through steam piping systems to provide local heating and/or chilling services. However, this necessarily is a highly localized service because thermal energy is not easily distributed over long distances. Accordingly such localized heating/chilling services are of much smaller geographical scope than that of the electrical grid, which can readily transmit electrical energy over great distances. Moreover, many generating plants are located at a substantial distance from areas of dense population, in which case the ability to utilize otherwise wasted heat energy to provide localized heating/chilling services may be negligible. A better system is needed that enables higher efficiencies in the conversion of thermal energies to more useful forms in order to extract more benefits therefrom.

SUMMARY OF THE INVENTION

In accordance with one aspect of the present invention, highly efficient energy conversions are realized through the use of numerous, highly localized and distributed "energy islands" incorporating micro power plants. The energy islands, which are made practical by this invention, can function bidirectionally with the primary electrical grid in a manner to reduce the transmission load on the grid and, in times of peak loads, feed supplemental power to the grid. The system of the invention not only generates electrical power in a uniquely efficient manner but also can use rejected heat from the generating process in a thermodynamically interactive manner to provide efficient localized heating and chilling services. Pursuant to the invention, much of the heat flows that conventionally are rejected to the ambient, are utilized in a manner which not only achieves greater efficiencies in the electrical generation process itself but also makes possible the practical and effective utilization of the heat flows in providing heating and chilling services. The end result of use of the new system is a very significant increase in the utilization efficiency of energy resources that are consumed.

The system of the invention for a micropowerplant is in part made practicable by the provision of a simplified and highly economical mechanisms operating in a closed Brayton cycle for effecting the necessary compression and expansion of a gaseous working fluid. Pursuant to one aspect of the invention, compressor and expander systems are comprised of modified forms of gear pumps, which can be easily and economically arranged for multi-stage operation in order to achieve desired levels of compression of the working fluid and to enable the energy of the compressed fluid to be efficiently converted to usable electrical and thermal energies. Gear pumps are widely used for the transfer of incompressible liquids, but are uniquely modified in accordance with the invention to provide inexpensive mechanisms for the multi-stage compression and expansion of compressible gaseous working fluids.

As a feature of the invention, otherwise standard forms of gear pumps, which typically have an inlet and an outlet and function as positive displacement mechanisms to simply transfer liquids from the inlet side to the outlet side, are provided with multiple additional fluid flow paths on the inlet side and outlet sides of the pump housings to accommodate multiple flows of the compressible gaseous fluid into and out of the pump housings at various points around the circumference of housing.

The modified gear pump mechanisms according to the invention include multiple inlet and outlet passages into and out of the gear housings. These passages impart unique functionality to the pumps, enabling the pumps to be effectively used for staged compression within a single pump. The simple mechanical nature of the gear pumps further makes them ideal for multi-staging of the pumps to achieve very high gaseous pressures in the final stage. Additionally and uniquely, the modified gear pumps may be used in a reverse flow configuration as expansion engines for the generation of electrical power. The energy flow concepts are basically the same as those employed in a standard Brayton cycle generating system employing turbines for compression and expansion of system gases. However, the new micropowerplant system preferably functions with simple, compact and inexpensive gear pump mechanisms rather than turbines. The new system thus is particularly suitable for use in micro power systems that can be installed and utilized on a highly localized and basis to deliver electrical and thermal energies much more efficiently than has been possible heretofore.

In accordance with another aspect of the invention, the closed cycle generating system, because of its small and compact size and the ability to be deployed in decentralized locations, includes novel provisions for thermodynamic interactivity. During periods of low electrical demand, the system may be operated in a manner to expand the gaseous working fluid to a cryogenic-level temperature and to pass the low temperature working fluid through a chill bank to cool a heat exchange mass to a correspondingly low temperature. During periods of peak electrical demand, the system may be operated in a manner to utilize the chilled heat exchange mass as a heat sink for the extraction of heat from the expanded working fluid, with the effect of greatly increasing the efficiency of the system in converting heat energy to electrical power output. In a typical daily cycle, there are periods of peak loads and periods of smaller loads. The chill bank can be recharged during the periods of low demand and discharged during periods of peak demand, in a manner to provide for significantly increased overall efficiencies in the conversion of thermal energy.

For a more complete understanding of the above and other features and advantages of the invention, reference should be made to the following detailed description of a preferred embodiment of the invention and to the accompanying drawings.

DETAILED DESCRIPTION OF THE INVENTION

Figure 1:
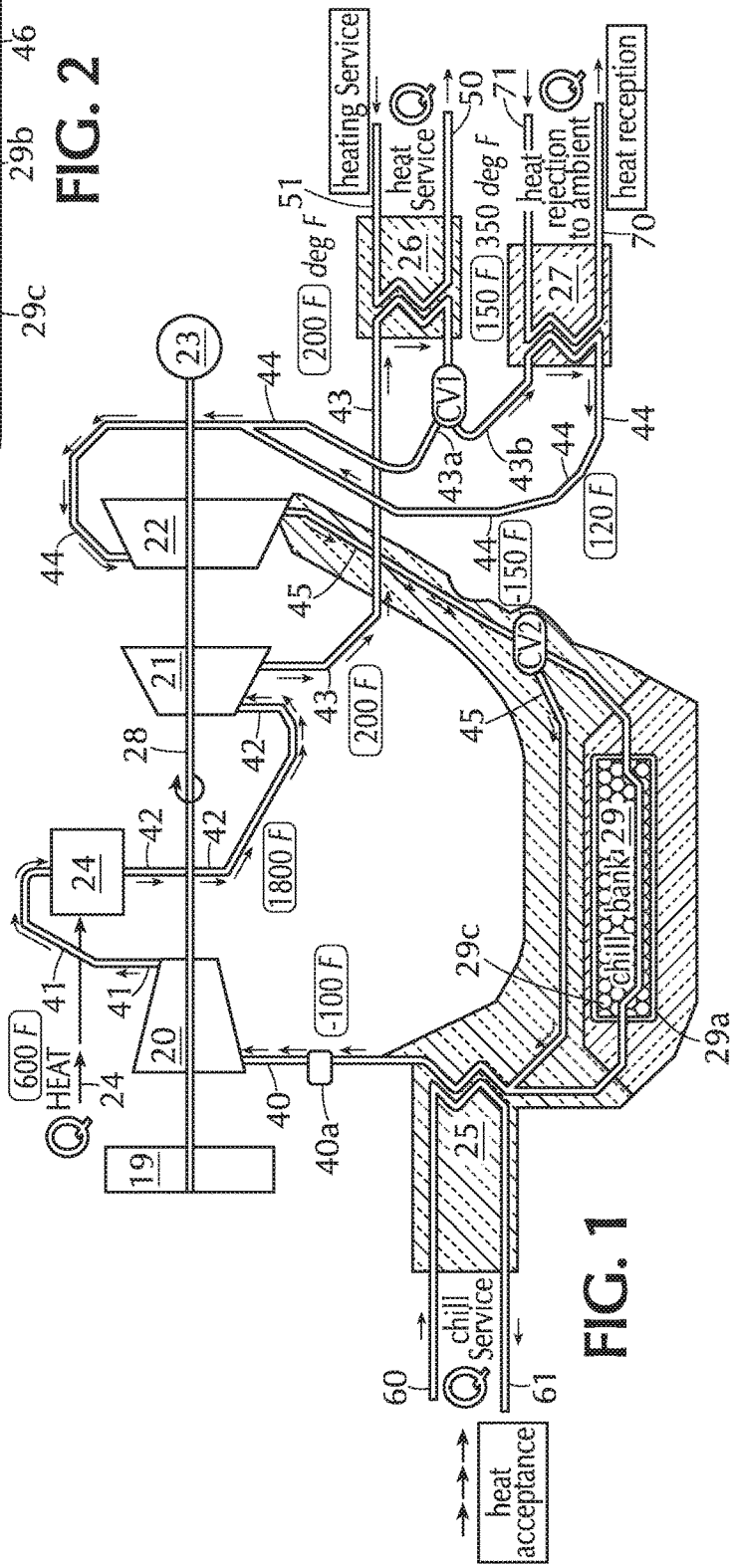
FIG. 1 is a highly simplified schematic representation of an advantageous heat flow process for any size power plant, including the novel micropowerplant of the invention, with provisions for thermodynamic interactivity capable of optimizing the conversion of energy resources into energy service provision.

Referring to the drawings, and initially to FIG. 1 thereof, the reference numeral 20 represents a compressor unit rotating on a common shaft 28 along with high temperature and low temperature expander units 21, 22 respectively. The shaft 28 is connected at one location, for example at one end, with an electrical generator 23 and may also mount a flywheel 19 at another location. A gaseous working fluid, which may for example, be argon or nitrogen, is supplied to the inlet end of the compressor 20 through a conduit 40. After compression, the working fluid, now at a significantly higher pressure, is directed through conduit 41 to a heat source 24 in which the compressed gas is heated to a substantially higher temperature. In an illustrative and non-limiting example, compressed gas entering the heat source at a temperature of 600° F. may exit the heat source at a temperature of 1800° F. The heated gas is directed through a conduit 42 to the inlet of a high temperature (first stage) expander 21, where it is expanded to provide mechanical shaft power for operation of the generator 23 and compressor 20.

In a known manner, the expanded working fluid discharged from the high temperature expander 21, which now may be at a temperature of about 200° F., is directed through conduit 43 to a heat-accepting heat exchanger 26 arranged to use heat rejected by the working fluid to provide localized heating service through a circulation system including outgoing and return conduits 50, 51. In this respect, it is contemplated by the invention that the power generating system will be of a "micro" size suitable for highly distributed and localized installation, such that the delivery of usable heating service to local homes and businesses, for example, is entirely practicable.

In accordance with aspects of the invention, gaseous working fluid discharged from the heat exchanger 26 is directed, via a control valve CV1, alternatively or proportionately into conduits 43a and/or 43b. Conduit 43a joins with conduit 44 to convey the working fluid from the heat exchanger 26, at a temperature of about 150° F., directly to the inlet of a low temperature (second stage) expander 22. Conduit 43b conveys the working fluid from the first heat-accepting heat exchanger 26 to a second heat-accepting heat exchanger 27 which, via its outgoing and return conduits 70, 71 enables excess heat to be rejected to the ambient. Working fluid from the second heat-accepting heat exchanger 27 is directed into conduit 44 at a temperature of about 120° F. and conveyed to the inlet of the second stage, low temperature expander 22.

Further expansion of the working fluid in the low temperature expander 22 provides additional mechanical shaft power for operation of the generator 23 and compressor 20. The fully expanded fluid is discharged from the second stage expander 22 into the conduit 45 at a cryogenic temperature level of about minus 120° F. to about minus 150° F. The cryogenic working fluid passes through a control valve CV2 and is directed alternatively or proportionately through a chill bank 29 or directly to a heat-rejecting chill service heat exchanger 25. The term "cryogenic" as used herein means extremely cold but does not mean that the gaseous working medium has been liquefied.

During periods of low demand for electrical service, the valve CV1 can be set to direct most or all of the working fluid through the second heat-accepting heat exchanger 27 in order to reject excess heat to the ambient. In such cases, the control valve CV2 is set to direct most or all of the cryogenic fluid at the lower temperature of about minus 150° F. through the chill bank 29 to accept heat from the heat exchange material in the bank and to "charge" the heat exchange material to a very low temperature. In accordance with the invention, the chill bank 29 comprises a large mass of thermally conductive material which can easily accept or give up heat when contacted by gaseous working fluid of a different temperature. In one practical embodiment of the invention the chill bank comprises a large, insulated containment vessel 29a which is filled with small metal spheres (not shown but which for example may be ¹⁄₁₆-⅛ inch in diameter) that are in direct contact with working fluid flowing throughout the containment vessel 29a and provide a large surface area for efficient heat transfer. In this respect, while the chill bank 29 is shown symbolically in drawings as being in the form of an indirect heat exchanger, the invention contemplates that there preferentially will be direct contact between the cryogenic working fluid and the metal spheres within the vessel 29a for more rapid and efficient heat transfer.

After exiting from the chill bank 29, the working fluid, which has warmed somewhat during its passage through the chill bank but is still very, very cold, enters a heat-rejecting, chill service heat exchanger 25. Through its outgoing and return conduits 61, 60, the chill service heat exchanger provides chill service locally, as needed. As with the heating service described above, providing localized chill service is practicable with the system of the invention because of the ability to provide for wide distribution of the micro-power systems which can efficiently and economically distribute heating and chill service over short distances.

A suitable size for the containment vessel 29a may be determined as a function of the capacity of the compressor-expander equipment and the typical or expected user cycles. Ideally the chill bank should have a capacity to accept a "charge" (i.e., chill down) throughout any low demand cycle and to be able to accept heat from the working fluid throughout periods of high demand.

When the chill bank 29 is "fully charged" such that its heat exchange mass is close to the minus 150° F. temperature of the fully expanded working fluid, and/or if there is an unusually high demand for chill service, the control valve CV2 may be adjusted to direct some or all of the working fluid to bypass the chill bank 29 and flow directly to the chill service heat exchanger 25.

After passing through the chill service heat exchanger 25, the working fluid, now at a temperature of about minus 100° F., is directed through conduit 40 back to the inlet of the compressor 20, to complete the closed cycle of working fluid flow. It may be desirable to incorporate a check valve 40a in the conduit 40, between the heat exchanger 25 and the compressor 20, to prevent back flow of working fluid, particularly during start up.

According to principles of the invention, charging of the chill bank 29 is performed during periods of low electrical demand, locally and on the grid. However, when the local and/or grid demand becomes heavy, the system of the invention is operated to take advantage of the heat acceptance capacity of the charged chill bank, allowing the generating system to operate at high efficiency while supplying electrical load locally (thereby keeping it off the grid) and/or in supplying power directly to the grid as a base load supplement, in order to reduce stress on the grid. This is enabled, in the system of the invention, by setting control valve CV1 to bypass the second heat-accepting heat exchanger 27 and to direct the working fluid through conduit 43a and directly back to the second stage expander 22. Under these conditions, the working fluid entering the low temperature expander 22 will be at a somewhat higher temperature of about 150° F. After expansion, the working fluid in conduit 45 may be at a temperature of about minus 120° F. However, in passing through the chill bank 29 the temperature of the expanded working fluid is brought down to the much lower temperature of the chill bank heat exchange material (i.e., close to minus 150° F.), which both increases the efficiency of the power generation and minimizes the rejection of heat to the atmosphere, achieving both economic and environmental benefits.

In the typical practice of the invention, the chill bank 29 will be functioning at all times, on a 24/7 basis, either being charged to a low temperature or accepting heat from the fully expanded working fluid. In this respect, the chill bank 29 has the functional effect of a "thermal battery", capable of rapidly storing and releasing thermal energy as needed for moderating the peaks and valleys of electrical power demand and supply. Because charging of the chill bank can be performed during periods of low electrical demand, when operating efficiency is less critical, and because the chill bank makes the system operationally more efficient during periods of maximum demand, the overall, day-to-day energy operating efficiency of the system is greatly improved over conventional systems.

Figure 2:
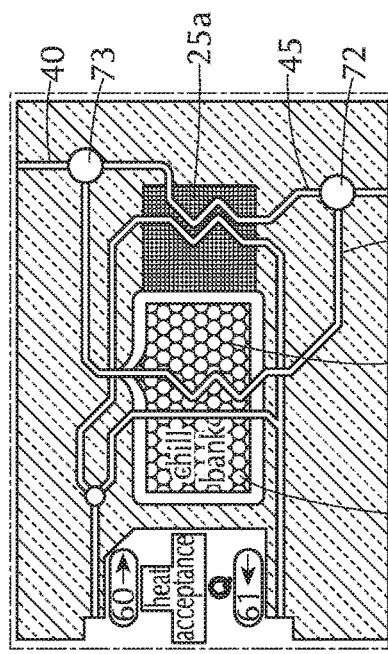
FIG. 2 is a schematic representation of a form of chill bank which can be incorporated into the system of FIG. 1.

FIG. 2 of the drawings shows a modified arrangement of the system, in which the chill bank 29b and chill service heat exchanger 25a are connected in parallel, via valves 72, 73, rather than in series. However, the functioning of the system is fundamentally the same as described above. With the arrangement of FIG. 2, low temperature working fluid from the second stage expander 22 can be directed exclusively through the chill bank 29b or the chill service heat exchanger 25a, or proportioned between the two according to energy demands. As with the previously described chill bank 29, the chill bank 29b, although symbolically shown as an indirect heat exchanger, preferentially is comprised of a vessel filled with small metal spheres that are in direct contact with the flowing gaseous medium forming the working fluid to provide highly efficient heat exchange properties.

Micro power plant systems according to the above described invention are made uniquely advantageous by the incorporation of a new form of compressor-expander mechanism according to another feature of the invention. This aspect of the invention involves the novel adaptation of gear pumps, normally used for the pumping of incompressible liquids, for both the compression and expansion of compressible gaseous working fluids. The new mechanisms are ideally suited for the handling of the gaseous working fluid media in a closed, micro-sized Brayton cycle generating system of the type described, although it will be understood that the new mechanism may be used to advantage in many other circumstances.

Referring now to FIGS. 3-6 of the drawings, reference numeral 74 designates generally the new gear pump of the invention. Meshing gears 75, 76 are fixed to shafts 100, 101 (FIG. 4) for rotation within a pump housing 77. The two gears 75, 76 are in a closely meshing relation at the center of the housing, in the region of a central plane including the axes of their respective shafts 100, 101. The gears are closely confined by circumferential internal housing walls 78 throughout most of their respective circumferences. The opposite axial end faces of the gears (typically flat) are closely confined by axial endplates 116, 117 (FIG. 5) of the housing. In accordance with known gear pump design and operation, primary inlet and outlet passages 79, 80 are located at opposite sides of the housing, and communicate with inlet and outlet chambers 79a and 80a closely adjacent to the region in which the gears are in meshing relation.

Figure 3:
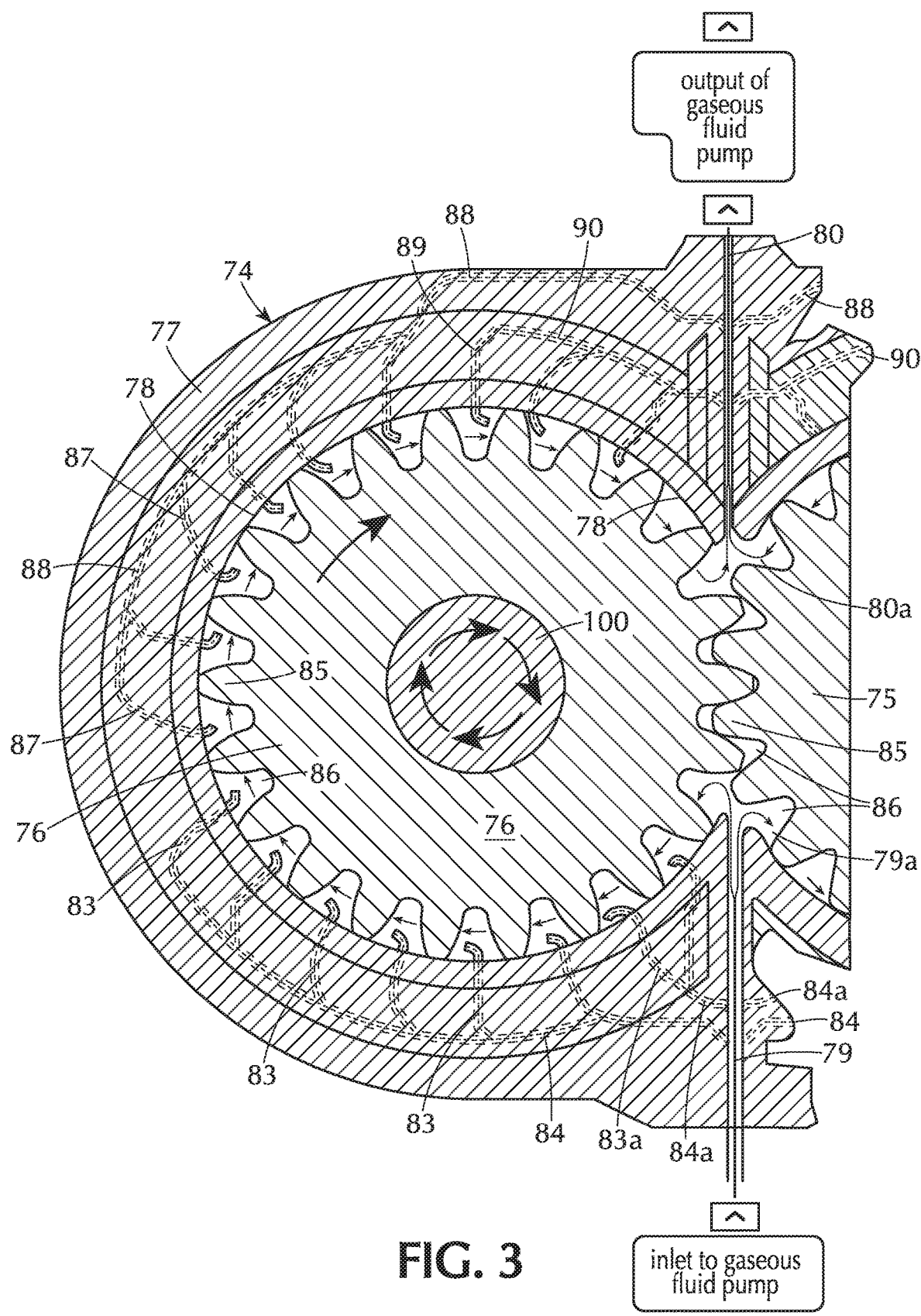
FIG. 3 is a schematic view of a form of modified gear pump constructed and arranged in accordance with the invention to serve as a gaseous fluid compressor or expander.

In standard gear pump operation, incompressible fluid is delivered into the pump housing via inlet passage 79 and then flows into and fills open voids between gear teeth exposed to the inlet chamber 79a. In the illustration of FIG. 3, the left side gear 76 rotates clockwise while the right side gear rotates counterclockwise. As the gear teeth move away from the inlet chamber the teeth are closely confined by the housing walls, closing the fluid-filled voids. Fluid in the voids is carried circumferentially about the interior of the housing until the voids arrive at and become open to the outlet chamber 80a. The meshing gear teeth prevent passage of the fluid between the gears, so that the incoming fluid is forced to exit through the outlet passage 80.

In accordance with aspects of the present invention, the pump is modified in a manner that enables it to effectively compress a compressible gaseous medium, in this particular case the gaseous working fluid of the above described generating system. It will be understood, however, that the modified mechanisms may be used for other purposes and are not limited to use in connection with power generation systems.

In the specific form of the pump illustrated in FIG. 3, each gear has 22 teeth 85 defining 22 voids 86 between teeth to receive the gaseous fluid. One or two of these voids, of each gear, are open and exposed to the inlet passage 79 and chamber 79a and are open to receive fluid directly therefrom. Pursuant to the invention, however, several of the closed voids 86 of each gear (the first eight closed voids in the illustrated device, located adjacent to but displaced circumferentially away from the inlet passage 79 and chamber 79a), are connected to the inlet passage by means of a plurality of individual supplemental passages 83, 83a each connected to a header passage 84 or 84a. The header passages 84, 84a are, in turn, connected to the inlet passage 79. This arrangement is such that the flow of gaseous fluid medium directed into these closed voids, which may be referred to as inlet voids, is increased and maximized via the supplemental passages 83, 83a as the gears are rotating the voids away from the inlet passage 79.

As the gears continue to rotate, the gas filled voids 86 that initially receive gas, both directly from the inlet passage 79 and chamber 79a and through the supplemental inlet passages 83, 83a, are conveyed around the housing, delivering the gas within the gear voids 86 to the outlet passage 80, and outlet chamber 80a. At this point the gas is forced through the outlet passage 80 against increased pressure at the outlet and is correspondingly compressed. Pursuant to another aspect of the invention, however, internal pressure staging is achieved within the gear pump by providing for partial return flows of the compressed gas exiting the pump at the outlet passage 80, 80a. In the specifically illustrated form of the invention, two sets of feedback passages 87, 89 are provided for directing pressurized gas from the outlet passage 80 back into certain of the closed and gas-filled gear voids 86 advancing toward the outlet. In the illustration of FIG. 3, there are six first stage feedback passages 87 positioned to communicate with six moving void spaces 86 located immediately after the inlet void spaces associated with the supplemental inlet passages 83. The feedback passages 87 are connected by a feedback header 88 to the outlet passage 80. This allows a portion of the compressed gas in the outlet passage to be fed back to the voids communicating with the first stage feedback passages 87 to increase the gas pressure within those voids.

The illustrated device also provides for a second stage feedback through second stage feedback passages 89, which are connected by a feedback header 90 to the outlet passage 80, upstream from the first stage feedback header 88. The second stage feedback passages 89 feed pressurized gas into the three closed but moving voids immediately following those communicating with the first stage feedback passages, to further pressurize the gaseous fluid within those three voids, immediately before the discharge from such voids into the outlet chamber 80a and passage 80. Thus, in the illustrated example of FIG. 3, illustrating a compressor with gears having 22 teeth 85 and an equal number of gear voids 86, 9 of the 18 closed gear voids, extending over an arcuate region of approximately 90° adjacent to the outlet passage 80, are connected to the feedback passages 87, 89. This novel arrangement provides for pressure staging within a single pump and enables the pump to deliver a maximized volume of the gaseous fluid at a higher pressure.

It is to be understood, of course, that the actions described with respect to the left side of the pump, illustrated in full in FIG. 3, are also being carried out in the same manner in the right side of the pump, which is provided with corresponding supplementary and feedback passages that are not specifically shown in the drawings.

To advantage, the supplemental inlet passages 83, 83a and related header passages 84, 84a, and the feedback passages 87, 89 and related headers 88, 90, schematically shown in part in FIG. 3, can be formed in end plates of the pump housings. This is reflected in FIGS. 5 and 6 of the drawings in which the reference numeral 77 represents an edge view of the main pump housing which closely surrounds the gears 75. 76. The reference numerals 116, 117 designate end plates that are secured to opposite sides of the main pump housing and serve to tightly enclose opposite end faces of the gears 75, 76.

Figure 6:
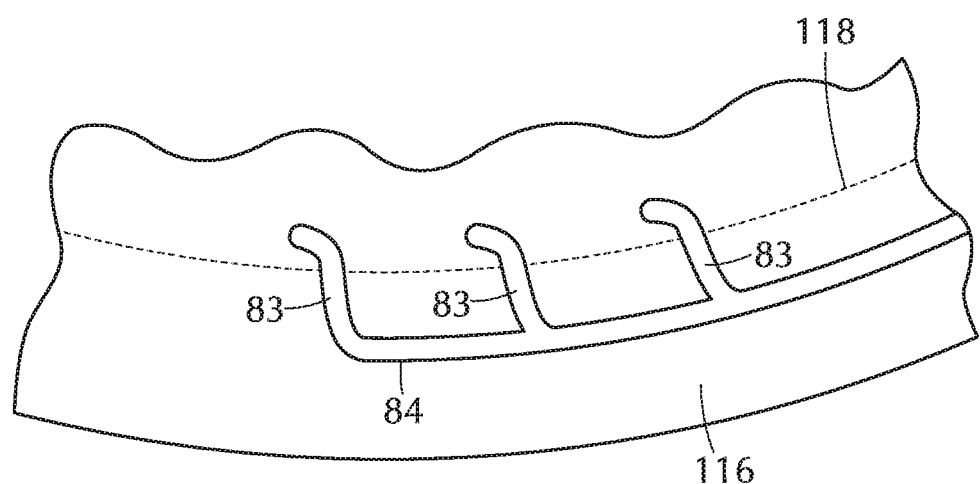
FIG. 6 is a fragmentary sectional view as taken generally on line 6-6 of FIG. 5 illustrating passage-forming grooves formed in pump end plates.

In FIG. 6, the arcuate dashed line 118 represents the path of travel of the outer tips of the gear teeth 85 within the pump housing and corresponds with the arcuate internal wall 78 of the pump housing. The supplemental inlet passages 83, 83a and header passages 84, 84a are provided by forming grooves in the inner face of the end plates 116, 117. One side of the grooves is closed by an opposing face 119, 120 of the main pump housing 77, except for the end extremities of the inlet passages, which are open to the internal space of the pump in the rotational path of the voids 86. As the voids become exposed to the inlet end extremities of the passages 83, 83a they receive additional gaseous medium, assuring that the moving voids are filled in an optimum manner. A similar structure is of course employed at both the inlet and outlet sides of the pump mechanism and whether the mechanism is used as a compressor or an expander.

The novel modified gear pump mechanisms of the invention enable very high gas compression ratios to be achieved, which makes these devices suitable for the multi-stage compression of gaseous working fluid in a closed cycle thermodynamic heat flow process, particularly for the production of electrical energy. Additionally and importantly the same modified gear pump mechanisms can be used to great advantage in the expansion phase of the closed cycle processes, by operating the mechanisms on a reverse flow basis. For operations involving expansion of the working fluid, the high pressure fluid is directed into the mechanism through the passage 80 that would serve as the outlet passage of a pump. The fluid enters the first one or two gear voids directly from the passage 80 and chamber 80a and also is directed into the nine adjacent voids through the passages 89, 87, driving the gears in the opposite direction from rotations when operated as a pump. The expanding gas is discharged partly through the supplemental passages 83, 83a and partly by direct discharge from voids exposed directly to the passage 79 and chamber 79a, now serving as an outlet passage. The arrangement assures a high rate of discharge of the expanding gas to derive optimum energy output through rotations of the gears driven by the expanding gas.

Figure 4:
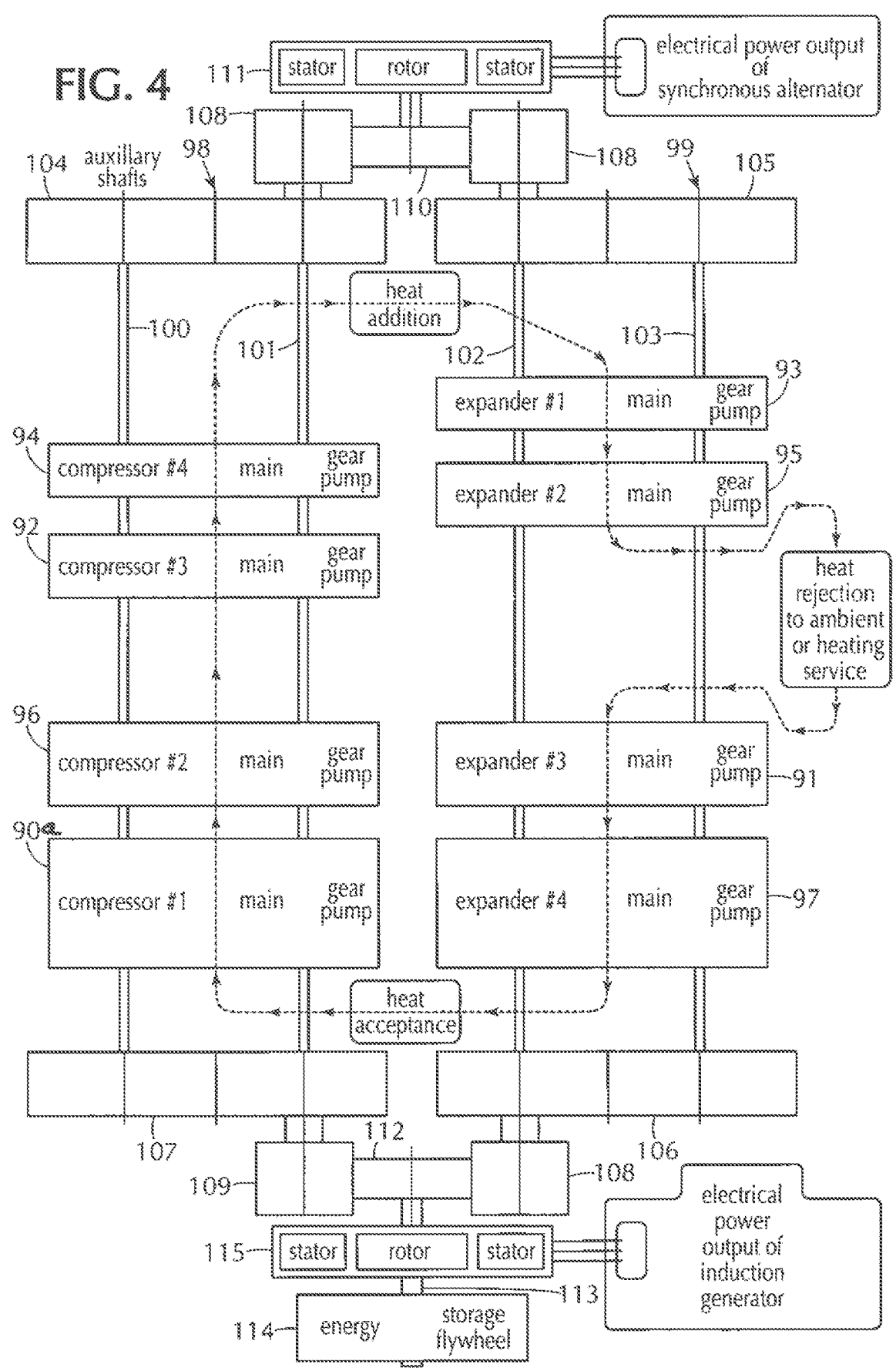
FIG. 4 is a simplified schematic representation showing a series of staged and mechanically interconnected gear pumps serving as compressors and expanders in the system of FIG. 1.
Figure 5:
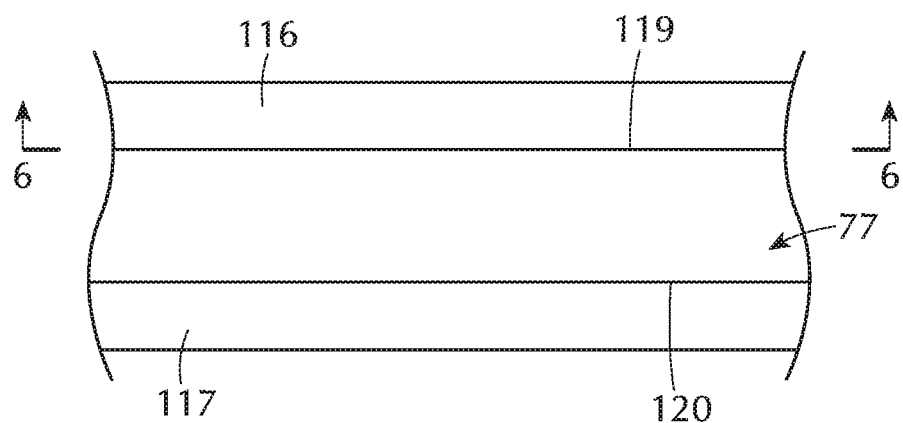
FIG. 5 is a fragmentary side elevational view of a pump mechanism according to the invention.

A novel and practical application of the gear pump compressor and expander units of FIG. 3 is shown in FIG. 4, which illustrates a stacked, multi-stage arrangement of compressors and expanders for operation of a closed cycle power generating system on the general principles of the system of FIG. 1. In FIG. 4, the numerals 90a, 96, 92 and 94 designate four stages of compressors having the general construction of FIG. 3. The numerals 93, 95, 91 and 97 designate four stages of expanders, also having the general construction of FIG. 3 but connected for operation in reverse. In the illustrated arrangement the volumetric capacity of the individual compressor stages 90a, 96, 92 and 94 decreases incrementally in accordance with the reduced volume of the partially compressed gas being delivered to it from the preceding compression stage. Likewise, the individual volumetric capacity of the individual expander stages 93, 95, 91 and 97 increases incrementally in accordance with the expanded volume of partially expanded gas being delivered to it from the preceding expansion stage. Because of the highly simplified structure of the compressor and expander units, it is convenient to arrange a four-stage system such that each stage is made to a consistent profile, with the thickness thereof increasing or decreasing by one thickness unit at each stage. This arrangement is represented in the illustration of FIG. 4.

Each of the above described stacks of compressors and expanders is associated with a pair of shafts. The left stack 98, comprising the four compressor stages, is connected by shafts 100, 101 and the right stack 99, comprising the four expander stages, is connected by shafts 102, 103. At each end of each shaft are meshing gear sets 104-107 that maintain the shafts in synchronism, independently of the internal gears 75, 76 of the compressors and expanders (shown in FIG. 3) and also maintain better balance in torque loading on the shafts. The inner shaft, 101, 102 of each stack mounts a gear 108 or 109 at one end. At the upper end of the stack, as viewed in FIG. 4, the gears 108 drive an output gear 110 connected to an alternator 111 for generating electrical power. At the lower end, as viewed in FIG. 4, the gears 108,109 drive a gear 112 and shaft 113 connected to a flywheel 114 and, if desired, to a second generator, such as an induction motor/generator. 115.

In the system of FIG. 4, the first or low pressure compressor stage 90*a* is of a thickness corresponding to four gear pumps, and its input is the output of a heat acceptance unit, such as the chill bank 29 and/or chill service heat exchanger 25 of FIG. 1. The second and third stage compressor units 96, 92 are of triple and double thickness respectively, and the fourth and last compressor stage 94 is of a single thickness. This accommodates the fact that, in each successive compression stage, the compressible gaseous working fluid will be under higher pressure and of lower volume.

In the illustrative embodiment of FIG. 4, the gaseous working fluid, after the fourth stage of compression at 94, is directed through a heat addition stage, corresponding to the unit 24 of FIG. 1. The heated and highly compressed fluid is then directed through the first and second expansion stages 93, 95. Preferably, after the second expansion stage 95 the gaseous working fluid is directed to a heat rejection stage, corresponding to items 26, 27 of FIG. 1, in which heat may be accepted by a heat service heat exchanger and/or to ambient. The now somewhat cooler working fluid is then further expanded in the third and fourth expansion stages 91, 97, at which stage the working fluid is at cryogenic temperature levels, preferably minus 120° or below. The working fluid is then directed from the fourth stage expander 97 through a heat acceptance stage, which may comprise a chill bank and/or chill service heat exchanger corresponding to units 29, 25 of FIG. 1. After the heat acceptance stage, the working fluid is directed back to the first compression stage to complete the working cycle.

As will be readily apparent, the modified gear pump devices are ideal mechanisms for incorporation in micro power plants capable of functioning with high compression and expansion ratios. Such micro power plants are suitable for use in widely distributed power generation that can serve both to reduce loads on the national grid during peak load periods and also to furnish supplementary base load power to the grid when necessary. The gear pump compressor and expander mechanisms are supremely simple and inexpensive yet have a high degree of functionality for the intended purposes. When combined with a chill bank feature, it is feasible to provide thermodynamically interactive "energy islands" that can store thermodynamic energy during periods of low demand and draw on that energy during peak load periods for optimizing operating efficiencies during those periods. Energy conversion efficiencies of as high as 85% are achievable during peak load periods while during off-peak periods, when storing thermodynamic energy in the chill bank, efficiencies of 50%-60% can be realized.

It will be clear that the thermodynamically interactive system of FIG. 1 is not limited to micropowerplant systems but can be highly beneficial in systems of any size. Likewise, the disclosed thermodynamically interactive system disclosed herein does not require the use of the special compressor-expander mechanisms of FIGS. 3-6. Moreover, uses of the new compressor-expander mechanisms are not limited to use in systems for the production of electrical power. Nevertheless, the inventions can be combined to achieve a synergistically beneficial result.

It will be understood that the specific forms of the invention herein illustrated and described are intended to be illustrative of principles of the invention and various modifications thereof are possible within the clear teachings of the disclosure. Accordingly reference should be made to the appended claims in determining the full scope of the invention.

What is claimed is:

1. A compressor mechanism for a gaseous fluid medium, which comprises
    a pair of first and second gears mounted for rotation on respective first and second shafts,
    said gears having opposite axial end faces and having gear teeth disposed circumferentially about said gears and extending between said axial end faces,
    the gear teeth of said first and second gears meshing in a limited region adjacent to a plane defined by said first and second shafts,
    a housing having opposed end faces closely enclosing the axial end faces of said gears and having internal surfaces of circular configuration closely surrounding outer ends of said circumferentially disposed gear teeth and, together with said housing end faces, defining enclosed pockets between adjacent gear teeth for conveying said gaseous fluid medium,
    said housing having fluid inlet passage means and fluid outlet passage means on opposite sides of said plane, for directing gaseous fluid medium to and away from said housing,
    supplemental fluid inlet passage means in said housing connected with and extending from said fluid inlet passage means in opposite circumferential directions relative to said gears for the discharge of gaseous fluid medium into pockets between gear teeth advancing circumferentially away from said inlet passage means, and
    a plurality of individual fluid feedback passages in said housing connected with and extending from said fluid outlet passage means in opposite circumferential directions with respect to said gears and having outlets positioned to discharge partially pressurized gaseous fluid medium into individual pockets between gear teeth advancing circumferentially toward said fluid outlet passage means.

2. A compressor mechanism according to claim 1, wherein, said supplemental fluid inlet passage means comprises a plurality of individual fluid inlet passages in said housing, said plurality of individual fluid inlet passages being connected to said fluid inlet passage means and each having an outlet positioned to discharge gaseous medium into said housing in regions thereof through which said individual pockets travel during rotation of said gears.

3. A compressor mechanism according to claim 2, wherein, certain of said plurality of individual fluid inlet passages are connected to said fluid inlet passage means by means of a header passage connected to at least two of said individual fluid inlet passages.

4. A compressor mechanism according to claim 1, wherein, certain of said plurality of individual fluid feedback passages are connected to said fluid outlet passage means by means of a header passage connected to at least two of said individual fluid feedback passages.

5. A compressor mechanism according to claim 1, wherein, in a compressor in which the gears have 22 teeth and 22 gear pockets between said teeth, nine of the gear pockets traveling circumferentially within the housing between the fluid inlet passage means and the fluid outlet passage means are connected by individual fluid feedback passages to said fluid outlet passage means.

6. A compressor mechanism according to claim 5, wherein, a first group of said individual fluid feedback passages are connected to said fluid outlet passage means by a first header passage, and a second group of said individual fluid feedback passages are connected to said fluid outlet passage means by a second header passage.

* * * * *